United States Patent
Taya

(10) Patent No.: US 11,589,023 B2
(45) Date of Patent: Feb. 21, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kaori Taya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 174 days.

(21) Appl. No.: 17/070,722

(22) Filed: Oct. 14, 2020

(65) Prior Publication Data

US 2021/0029338 A1 Jan. 28, 2021

Related U.S. Application Data

(63) Continuation of application No. 16/396,203, filed on Apr. 26, 2019, now Pat. No. 10,841,555.

(30) Foreign Application Priority Data

May 2, 2018 (JP) .............................. JP2018-088654

(51) Int. Cl.
| | |
|---|---|
| *H04N 13/111* | (2018.01) |
| *H04N 5/222* | (2006.01) |
| *H04N 13/282* | (2018.01) |
| *H04N 5/232* | (2006.01) |
| *H04N 13/00* | (2018.01) |

(52) U.S. Cl.
CPC ......... *H04N 13/111* (2018.05); *H04N 5/2226* (2013.01); *H04N 5/23219* (2013.01); *H04N 13/282* (2018.05); *H04N 2013/0085* (2013.01)

(58) Field of Classification Search
CPC .. H04N 13/111; H04N 13/282; H04N 5/2226; H04N 5/23219; H04N 2013/0085
See application file for complete search history.

(56) References Cited

U.S. PATENT DOCUMENTS

2017/0148222 A1* 5/2017 Holzer .................. G06T 3/4038

OTHER PUBLICATIONS

A computer English Translation of Japanese Patent No. JP 2016-48467A to Sanko, pp. 1-7. (Year: 2016).*

* cited by examiner

*Primary Examiner* — Daniel G Mariam
(74) *Attorney, Agent, or Firm* — Canon U.S.A., Inc. IP Division

(57) ABSTRACT

An image processing apparatus acquires first shape information representing a three-dimensional shape about an object located within an image capturing region based on one or more images obtained by one or more imaging apparatuses for performing image capturing of the image capturing region from a plurality of directions, acquires second shape information representing a three-dimensional shape about an object located within the image capturing region based on one or more images obtained by one or more imaging apparatuses, acquires viewpoint information indicating a position and direction of a viewpoint, and generates a virtual viewpoint image corresponding to the position and direction of the viewpoint indicated by the acquired viewpoint information based on the acquired first shape information and the acquired second shape information, such that at least a part of the object corresponding to the second shape information is displayed in a translucent way within the virtual viewpoint image.

13 Claims, 10 Drawing Sheets

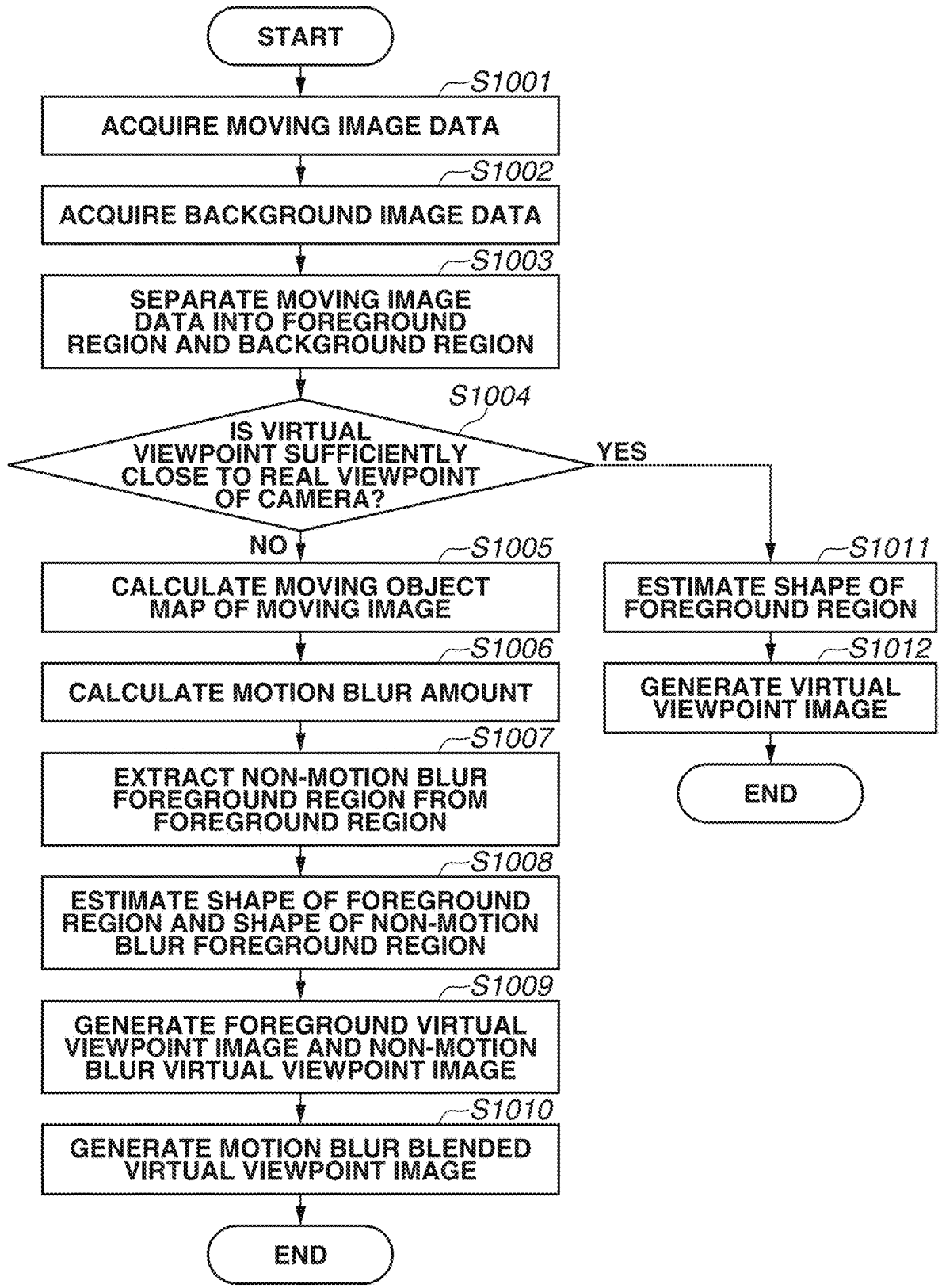

IMAGE PROCESSING APPARATUS, IMAGE PROCESSING METHOD, AND STORAGE MEDIUM

CROSS-REFERENCE TO RELATED APPLICATIONS

This application is a continuation of U.S. patent application Ser. No. 16/396,203, filed on Apr. 26, 2019, which claims the benefit of Japanese Patent Application No. 2018-088654, filed on May 2, 2018, both of which are hereby incorporated by reference herein in their entirety.

BACKGROUND

Field of the Disclosure

Aspects of the present invention generally relate to an image processing apparatus, an image processing method, and a storage medium and, more particularly, to those suited to be used for generating a virtual viewpoint image.

Description of the Related Art

There is a known technique which reconstructs (generates), based on images obtained by capturing, with a plurality of imaging apparatuses, images of a subject (for example, an object such as a person or a part of the person), an image (virtual viewpoint image) that is obtained when the subject is observed from a virtual viewpoint (an optional viewpoint including a viewpoint at which an imaging apparatus is not actually present). Japanese Patent No. 5,011,224 discusses the following method. First, the method generates a three-dimensional model of the subject with use of captured images of the subject captured with a plurality of cameras and the location information about the cameras. Next, the method generates a texture image (blended texture image) at each position on the three-dimensional model by blending texture images shown in a plurality of captured images. Finally, the method performs texture mapping of the blended texture images onto the three-dimensional model, thus reconstructing an image observed from a virtual viewpoint.

However, in the technique discussed in Japanese Patent No. 5,011,224, in a case where motion blur (a moving subject being shown in a captured image while being blurred) has occurred in a captured image, there is a possibility that a portion at which motion blur has occurred may be rendered as a large shape that is different from the actual shape. In other words, there is an issue in that it is not easy to appropriately generate a virtual viewpoint image in a case where motion blur has occurred in a captured image.

SUMMARY

According to an aspect of the present invention, an image processing apparatus includes a first acquisition unit configured to acquire first shape information representing a three-dimensional shape about an object located within an image capturing region based on one or more images obtained by one or more imaging apparatuses among a plurality of imaging apparatuses which performs image capturing of the image capturing region from a plurality of directions, a second acquisition unit configured to acquire second shape information representing a three-dimensional shape about an object located within the image capturing region based on one or more images obtained by one or more imaging apparatuses among the plurality of imaging apparatuses, wherein the three-dimensional shape represented by the first shape information reflects a large effect of motion blur as compared with the three-dimensional shape represented by the second shape information, a viewpoint information acquisition unit configured to acquire viewpoint information indicating a position and direction of a viewpoint, and a generation unit configured to generate a virtual viewpoint image according to the position and direction of the viewpoint indicated by the acquired viewpoint information based on the acquired first shape information and the acquired second shape information, such that at least a part of the object corresponding to the second shape information is displayed in a translucent way within the virtual viewpoint image.

Further features of the present invention will become apparent from the following description of exemplary embodiments with reference to the attached drawings.

BRIEF DESCRIPTION OF THE DRAWINGS

FIG. 10 is a flowchart illustrating a third example of the image processing method.

DESCRIPTION OF THE EMBODIMENTS

Various exemplary embodiments, features, and aspects of the invention will be described in detail below with reference to the drawings.

An image processing system according to a first exemplary embodiment of the present invention acquires motion information about a subject (for example, an object such as a person) from a captured image, and identifies a region in which blur is occurring due to motion of the subject and a region in which blur is not occurring in the captured image based on the speed of the motion and an image capturing condition. Then, the image processing system generates (reconstructs) an image obtained when the subject is observed from a virtual viewpoint with use of a plurality of captured images in such a manner that the region in which blur is occurring is displayed in a translucent way. The image processing system according to the first exemplary embodiment is applicable to a plurality of pieces of image data which is obtained by capturing images of the same subject from respective different viewpoints. In the following description, an image which is obtained when a subject is observed from a virtual viewpoint is referred to as a "virtual viewpoint image" as needed. Moreover, blur which occurs in at least one of regions of the subject in a captured image due to motion of the subject is referred to as "motion blur" as needed.

Figure 1:
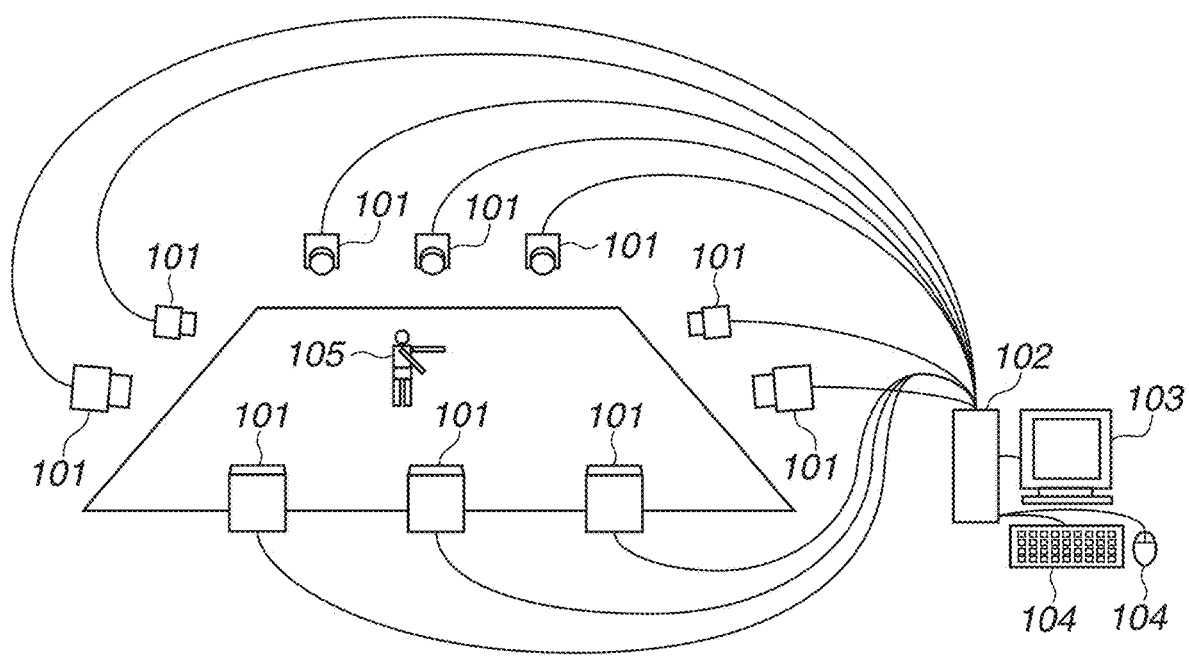
FIG. 1 is a diagram illustrating a configuration of an image processing system.

FIG. 1 is a schematic diagram illustrating an example of a configuration of the image processing system. The image processing system includes a plurality of cameras (imaging apparatuses) 101, an image processing apparatus 102, a display device 103, and an input device 104. The cameras 101 capture images of a subject 105 from viewpoints in a plurality of directions located in such a way as to surround the subject 105, which is situated within an image capturing region on an approximately flat surface. The display device 103 and the input device 104 are connected to the image processing apparatus 102. The user can perform an input operation on the image processing apparatus 102 with use of the display device 103 and the input device 104. With the input operation, the user performs, for example, setting of an image capturing condition and confirmation of image data acquired by image capturing performed by the cameras 101.

Figure 2:
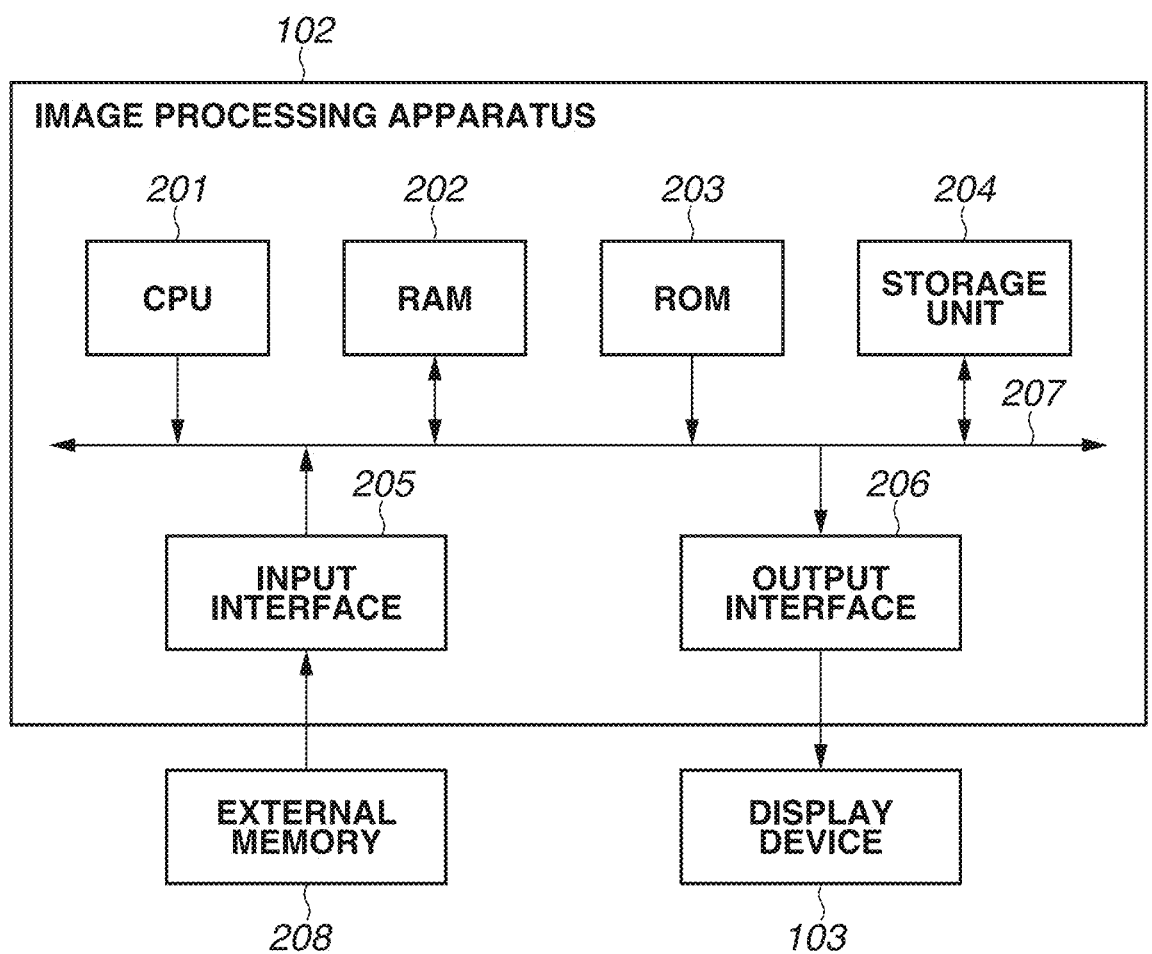
FIG. 2 is a diagram illustrating a configuration of hardware of an image processing apparatus.

FIG. 2 is a block diagram illustrating an example of a configuration of hardware of the image processing apparatus 102. The image processing apparatus 102 includes a central processing unit (CPU) 201, a random access memory (RAM) 202, a read-only memory (ROM) 203, a storage unit 204, an input interface 205, an output interface 206, and a system bus 207. An external memory 208 is connected to the input interface 205. The display device 103 is connected to the output interface 206.

The CPU 201 is a processor which comprehensively controls various constituent elements of the image processing apparatus 102. The RAM 202 is a memory which functions as a main memory or work area for the CPU 201. The ROM 203 is a memory which stores, for example, a program which is used for processing in the image processing apparatus 102. The CPU 201 performs various processing operations by executing the program stored in the ROM 203 while using the RAM 202 as a work area.

The storage unit 204 is a storage device which stores, for example, image data which is to be used for processing performed by the image processing apparatus 102 and parameters which are used for such processing (in other words, setting values). The storage unit 204 to be used includes, for example, a hard disk drive (HDD), an optical disc drive, or a flash memory.

The input interface 205 is a serial bus interface of, for example, the Universal Serial Bus (SUB) or IEEE 1394 standard. The image processing apparatus 102 is able to acquire, for example, image data targeted for processing from the external memory 208 (for example, a hard disk drive, a memory card, a CompactFlash (CF) card, a Secure Digital (SD) card, or a USB memory) via the input interface 205. The output interface 206 is a video output terminal of, for example, the Digital Visual Interface (DVI) or High-Definition Multimedia Interface (HDMI®) standard. The image processing apparatus 102 is able to output image data processed by the image processing apparatus 102 to the display device 103 (an image display device such as a liquid crystal display) via the output interface 206. Furthermore, the image processing apparatus 102 can also include, besides the above-mentioned elements, additional constituent elements, which are not a keynote of the present invention and are, therefore, omitted from the detailed description.

Figure 3:
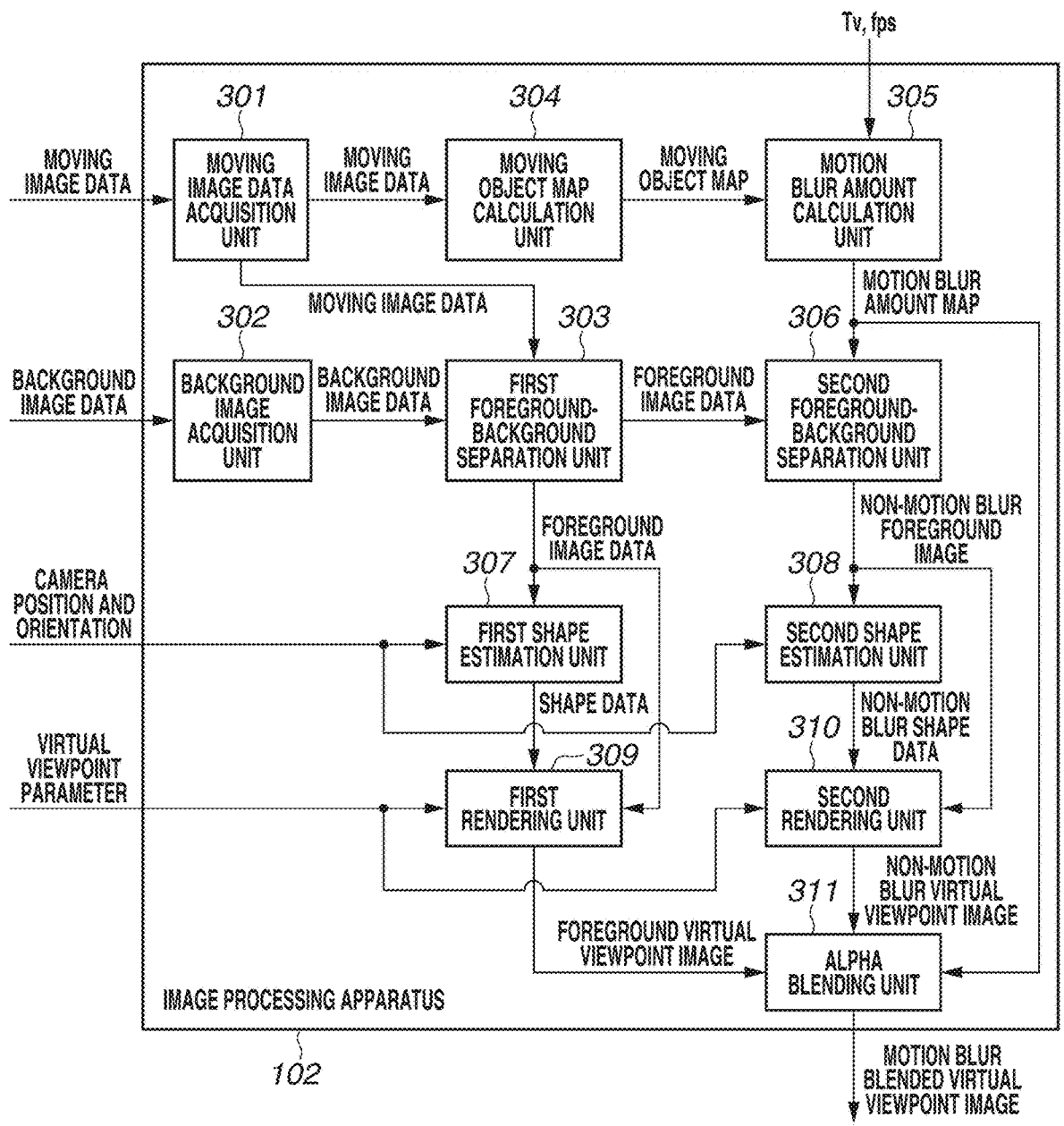
FIG. 3 is a diagram illustrating a first example of a functional configuration of the image processing apparatus.
Figure 4:
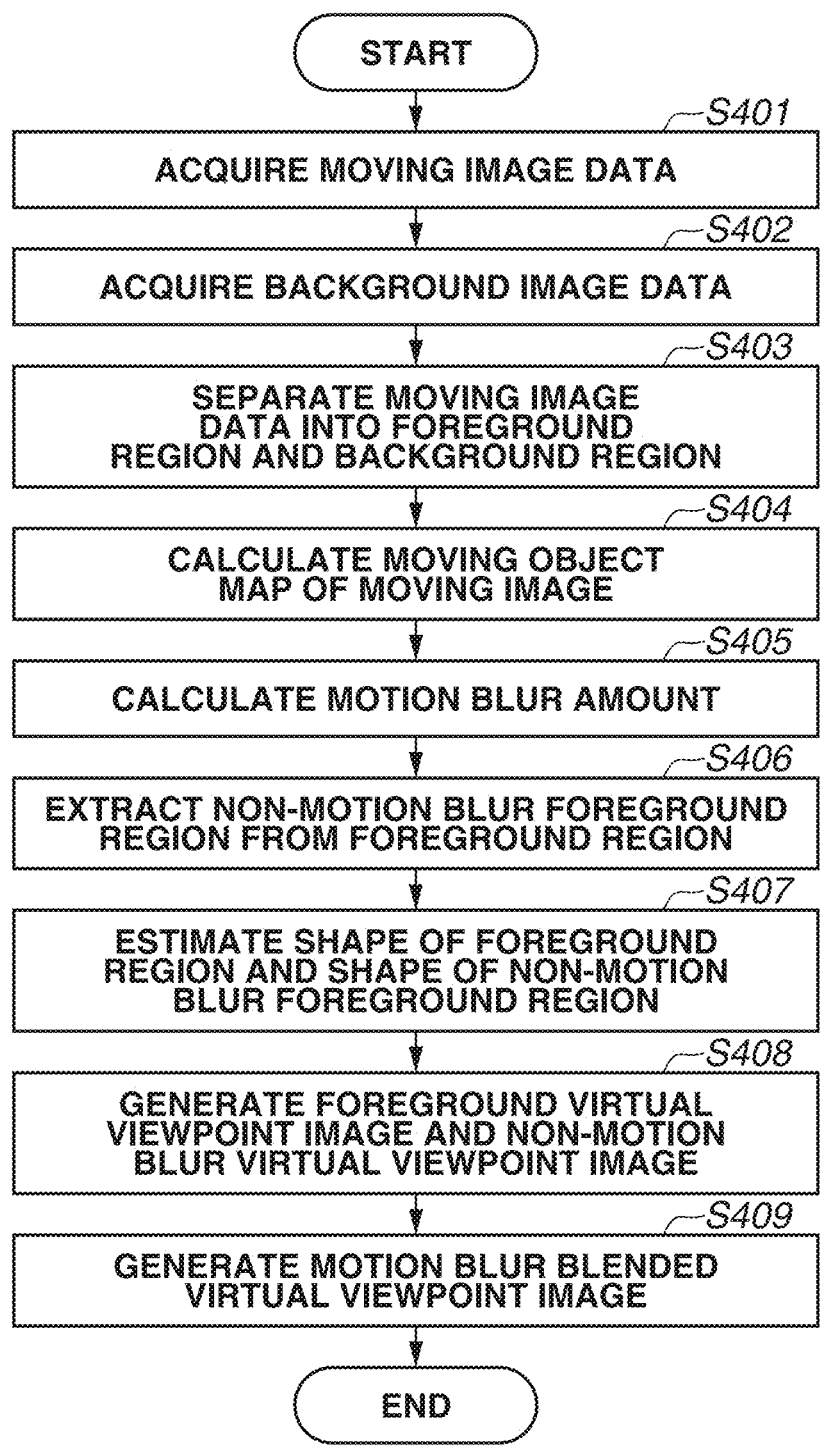
FIG. 4 is a flowchart illustrating a first example of an image processing method.
Figure 5:
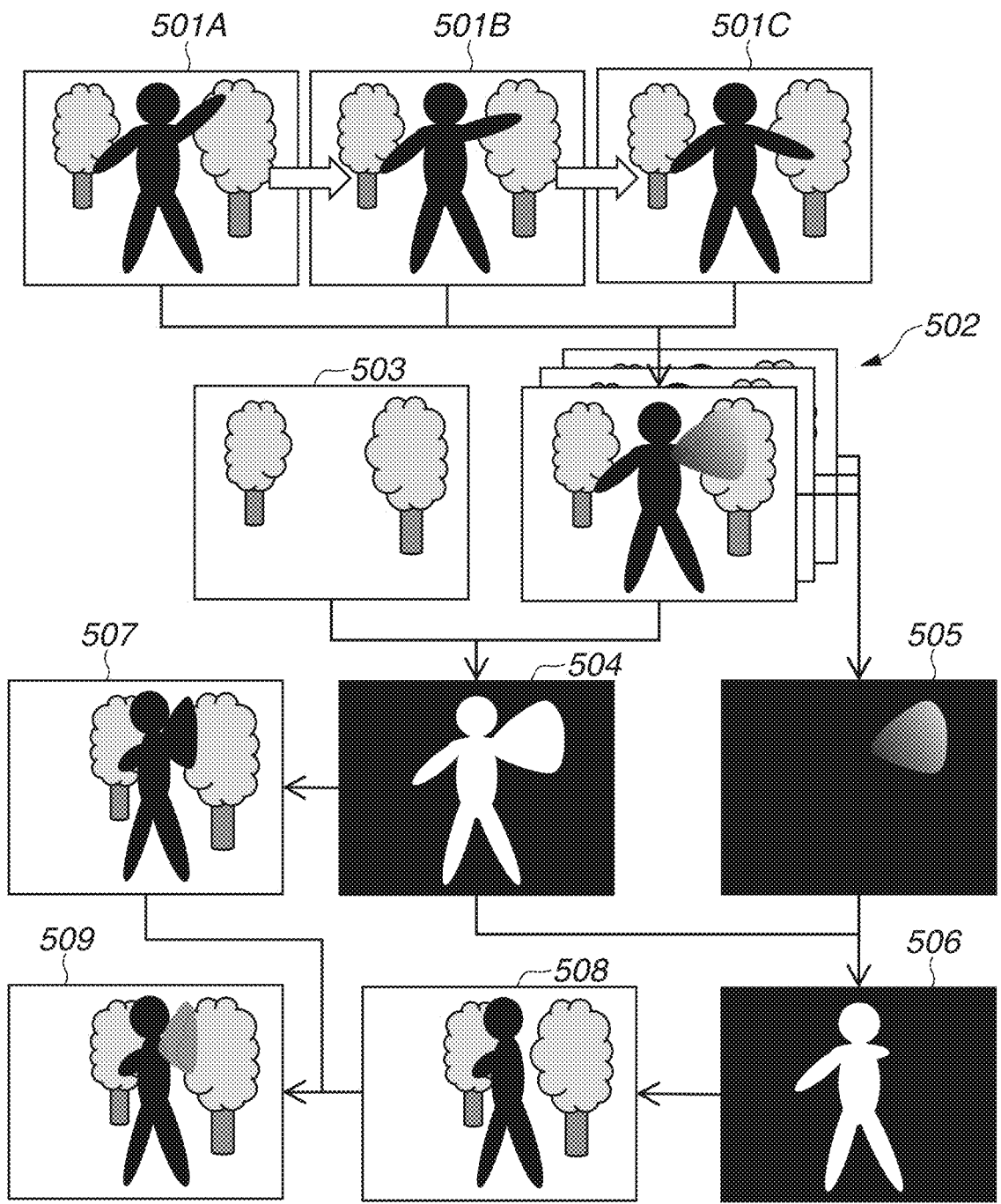
FIG. 5 is a diagram illustrating a first example of contents of image processing.

Hereinafter, an example of image processing performed in the image processing apparatus 102 according to the first exemplary embodiment is described with reference to FIG. 3, FIG. 4, and FIG. 5. FIG. 3 is a block diagram illustrating an example of a functional configuration of the image processing apparatus 102 according to the first exemplary embodiment. FIG. 4 is a flowchart illustrating an example of an image processing method according to the first exemplary embodiment. FIG. 5 is a schematic diagram illustrating an example of contents of image processing in the first exemplary embodiment.

In the first exemplary embodiment, the CPU 201 executes a program stored in the ROM 203 to function as each block illustrated in FIG. 3, thus performing processing in the flowchart of FIG. 4. Furthermore, the CPU 201 does not necessarily need to perform all of the functions of the image processing apparatus 102, but the image processing apparatus 102 can include processing circuits corresponding to the respective functions thereof and the processing circuits can perform the respective functions.

FIG. 5 illustrates contents of image processing which is performed in a case where, as an example, image capturing is performed on a subject with the left arm being quickly moved. Images representing the actual motion of the subject are acquired in the order of an image 501A, an image 501B, and an image 501C. However, when the exposure time (Tv) of the cameras 101 is long, an image in which motion blur is occurring at the left arm portion, such as an image 502, is captured by the cameras 101.

In step S401, a moving image data acquisition unit 301 acquires a plurality of pieces of moving image data from the external memory 208 via the input interface 205, and stores the acquired plurality of pieces of moving image data in the RAM 202. The plurality of pieces of moving image data is pieces of image data obtained by capturing, with the respective cameras 101, images of the same subject from respective different viewpoints, in other words, pieces of moving image data representing the same subject from respective different viewpoints. In FIG. 5, an example in which moving image data is acquired as images 502 is illustrated.

Next, in step S402, a background image acquisition unit 302 acquires a plurality of pieces of background image data corresponding to the plurality of pieces of moving image data acquired in step S401 from the external memory 208 via the input interface 205, and stores the acquired plurality of pieces of background image data in the RAM 202. In FIG. 5, an example in which background image data (captured by a given camera 101) is acquired as an image 503 is illustrated. Furthermore, background images are assumed to be images previously captured by the respective cameras 101 in a state in which the subject 105 is not present, and are assumed to be previously stored in the external memory 208. It is favorable that the positions and orientations of the respective cameras 101 taken during image capturing of the background images are the same as those taken when the subject 105 is present.

Next, in step S403, a first foreground-background separation unit 303 separates moving image data into a foreground image and a background image based on a difference between the moving image data and the background image data stored in the RAM 202, and stores the obtained foreground image and background image in the RAM 202. The first foreground-background separation unit 303 generates, for example, image data which has the same size as those of moving image data and background image data and the value of each pixel of which is binary, as foreground-background image data. Then, the first foreground-background separation unit 303 performs, on each pixel, processing for, in a case where the absolute value of a difference between pixel values of mutually corresponding pixels of the moving image data and the background image data exceeds a threshold value, allocating white (1) to the corresponding pixel and, if this is not the case, allocating black (0) to the corresponding pixel. In this situation, the region to which white (1) has been allocated serves as a foreground region, and the region to which black (0) has been allocated serves as a background region. The first foreground-background separation unit 303 stores such foreground-background image data in the RAM 202 together with the moving image data and the background image data. In FIG. 5, an example in which the foreground-background image data is acquired as an image 504 is illustrated.

Next, in step S404, a moving object map calculation unit 304 calculates a moving object map of the moving image from the moving image data stored in the RAM 202, and stores the calculated moving object map in the RAM 202. The moving object map is a map in which the amounts of movement of a subject in an image of each frame with respect to an image of the preceding or succeeding frame in the x and y coordinates are stored on a pixel-by-pixel basis in a map-like manner. For the purpose of reducing the amount of calculation, the moving object map calculation unit 304 can calculate a moving object map of only the above-mentioned foreground region by calculating the motion of only portions of the foreground region stored in the RAM 202.

Next, in step S405, a motion blur amount calculation unit 305 calculates a motion blur amount based on the moving object map, the exposure time (Tv) [sec], and the frequency [frames per second (fps)], and stores the calculated motion blur amount in the RAM 202. Furthermore, the frequency is a frame rate, and is a frequency corresponding to an image capturing period. In the first exemplary embodiment, the motion blur amount is the size of blur of a subject in an image, which is expressed by the number of pixels. As a method of calculating the motion blur amount, for example, when the amount of movement at each pixel of the moving object map is denoted by (x, y) [pixels/frame], the motion blur amount calculation unit 305 can calculate the motion blur amount [pixel] according to the following formula (1).

$$Tv \times fps \times \sqrt{x^2 + y^2} \qquad (1)$$

Moreover, for example, the motion blur amount calculation unit 305 can store, in the RAM 202, the motion blur amount (numerical value) allocated in a map format to each pixel of an image for each camera 101. Hereinafter, the motion blur amount which is stored in a map format is referred to as a "motion blur amount map" as needed. In FIG. 5, in a motion blur amount map 505, values corresponding to the left arm portion which is moving fast indicate a large motion blur amount.

Next, in step S406, a second foreground-background separation unit 306 extracts a non-motion blur foreground region from the above-mentioned foreground-background image data, and stores the extracted non-motion blur foreground region in the RAM 202. The second foreground-background separation unit 306 is an example of an identification unit for identifying a first foreground region including a portion in which motion blur is occurring and a second foreground region not including the portion based on one or more images obtained by one or more imaging apparatuses among a plurality of imaging apparatuses. Specifically, for example, the second foreground-background separation unit 306 can set a region which is the foreground region (white region) out of the foreground-background image data (image 504) and in which corresponding values of the motion blur amount map 505 are less than or equal to a predetermined threshold value (black region), as a non-motion blur foreground region. In FIG. 5, an example in which the non-motion blur foreground region is acquired as an image 506 is illustrated. In this way, the non-motion blur foreground region is a region in which motion blur is not occurring out of the foreground region. In other words, the non-motion blur foreground region is a region obtained by removing, from a foreground region including a portion in which motion blur is occurring, the portion. A region other than the non-motion blur foreground region out of the foreground region is a region in which motion blur is occurring, and is a region in which a foreground and a background are mixed and are, therefore, unable to be distinguished from each other (motion blur region).

Next, in step S407, a first shape estimation unit 307 estimates a three-dimensional shape of the foreground region. The first shape estimation unit 307 is an example of a first acquisition unit for acquiring first shape information representing a three-dimensional shape about an object located within an image capturing region, based on one or more images obtained by one or more imaging apparatuses among a plurality of imaging apparatuses which performs image capturing of the image capturing region from a plurality of directions. Moreover, a second shape estimation unit 308 estimates a three-dimensional shape of the non-motion blur foreground region. The second shape estimation unit 308 is an example of a second acquisition unit for acquiring second shape information representing a three-dimensional shape about an object located within the image capturing region, based on one or more images obtained by one or more imaging apparatuses among the plurality of imaging apparatuses. Results of these estimations represent three-dimensional shapes concerning the same person. However, a large effect of motion blur caused in image capturing performed by an imaging apparatus is seen on the three-dimensional shape of the foreground region estimated by the first shape estimation unit 307 as compared with the three-dimensional shape of the non-motion blur foreground region. The estimation of a shape is performed with use of, for example, a camera position and orientation parameter including information indicating the position and orientation of each camera 101. The method of estimating a shape includes, for example, a method using the Visual Hull method, which is a well-known technique. For example, the first shape estimation unit 307 uses the Visual Hull method to project silhouettes of the foreground region onto a real space, and estimates a portion in which the silhouettes overlap as a shape of the foreground. For example, the first shape estimation unit 307 and the second shape estimation unit 308 can store, in the RAM 202, a map in which, for each camera 101, distances (serving as information indicating a shape) are allocated to the respective pixels of an image in a map format. Here, the distance refers to a distance from an output viewpoint to a subject shown in a pixel of interest. In the following description, such distances stored in a map format are referred to as a "distance map" as needed. The output view refers to a virtual viewpoint.

There are known methods of generating a distance map based on captured images of a subject obtained by a plurality of cameras 101, and any one of the methods can be employed. For example, the method can use the silhouette volume intersection (Visual Hull) method discussed in Japanese Patent No. 5,011,224 or the stereo matching method to generate a three-dimensional model representing a three-dimensional shape of the subject. Then, the method derives, based on a relationship between a virtual viewpoint and the three-dimensional model of the subject, distances from the virtual viewpoint to the corresponding subject with respect to the respective pixels of the virtual viewpoint image, and stores the derived distances in a distance map. The method of generating a distance map is not limited to a method that is based on a captured image of the subject, but the method can generate a three-dimensional model of the subject with use of, for example, any tracker and can generate a distance map based on the three-dimensional model. Moreover, the method can previously measure a distance from the virtual viewpoint to the corresponding subject with use of, for example, a range sensor, thus acquiring a distance map.

Next, in step S408, a first rendering unit 309 performs rendering of the shape of a foreground region, thus generating a foreground virtual viewpoint image corresponding to the position and direction of the virtual viewpoint. Moreover, a second rendering unit 310 performs rendering of the shape of a non-motion blur foreground image, thus generating a non-motion blur virtual viewpoint image corresponding to the position and direction of the virtual viewpoint. In performing rendering, for example, a virtual viewpoint parameter serving as viewpooint information indicating the position of the virtual viewpoint and the direction of a line of sight. The first rendering unit 309 and the second rendering unit 310 are examples of a viewpoint information acquisition unit for acquiring viewpoint information indicating a position and direction of a viewpoint.

Hereinafter, an example of the outline of processing performed by the first rendering unit 309 and the second rendering unit 310 is described.

The processing performed by the first rendering unit 309 and the second rendering unit 310 is equivalent to processing for identifying the position of a subject present in a direction of interest based on the distance map and extracting color information about the subject from a captured image. In other words, with respect to a pixel of interest in a virtual viewpoint image, the first rendering unit 309 and the second rendering unit 310 identify the position of a subject shown in the pixel of interest based on a distance map and extract color information about the subject shown in the pixel of interest from a captured image. Specifically, the first rendering unit 309 and the second rendering unit 310 identify a pixel on a captured image corresponding to a subject present in a direction of interest based on a distance from the virtual viewpoint to the subject present in the direction of interest and a relationship in position and orientation between the virtual viewpoint and the camera 101. Then, the first rendering unit 309 and the second rendering unit 310 acquire color information about the identified pixel as color information about the subject present in the direction of interest from the virtual viewpoint.

This processing can be performed in the following manner. In the following description, the coordinates of a pixel of interest in a virtual viewpoint image are assumed to be $(u_0, v_0)$. The position of a subject shown in the pixel of interest can be expressed by coordinates in the camera coordinate system at the output viewpoint according to the following formula (2).

$$\begin{pmatrix} x_0 \\ y_0 \\ z_0 \end{pmatrix} = \frac{d_0(u_0, v_0)}{f_0} \begin{pmatrix} u_0 - c_{x0} \\ v_0 - c_{y0} \\ f_0 \end{pmatrix} \quad (2)$$

In formula (2), $(x_0, y_0, z_0)$ represents the coordinates in the camera coordinate system of the subject. $d_0(u_0, v_0)$ represents a distance from the output viewpoint to the subject shown in the pixel of interest, which is indicated in the distance map. $f_0$ represents the focal length of the output viewpoint, and $c_{x0}$ and $c_{y0}$ represent the principal point position of the output viewpoint. Next, with regard to the subject shown in the pixel of interest, the coordinates in the camera coordinate system at the output viewpoint can be converted into the coordinates in a world coordinate system according to the following formula (3).

$$\begin{pmatrix} X_0 \\ Y_0 \\ Z_0 \end{pmatrix} = R_0^{-1} \begin{pmatrix} x_0 \\ y_0 \\ z_0 \end{pmatrix} + \begin{pmatrix} X_{output} \\ Y_{output} \\ Z_{output} \end{pmatrix} \quad (3)$$

In formula (3), $(x_0, y_0, z_0)$ represents the coordinates in the world coordinate system of the subject. $R_0$ represents the optical axis direction of the output viewpoint. $(x_{output}, y_{output}, z_{output})$ represents the coordinates in the world coordinate system of the output viewpoint.

Next, the coordinates on the captured image from the input viewpoint, in which a subject present at the coordinates $(x_0, y_0, z_0)$ in the world coordinate system of the subject is shown, can be calculated according to the following formula (4). The input viewpoint refers to the viewpoint of the camera 101.

$$\begin{pmatrix} X_0 \\ Y_0 \\ Z_0 \end{pmatrix} = t R_i^{-1} \begin{pmatrix} u_i - c_{xi} \\ v_i - c_{yi} \\ f_i \end{pmatrix} + \begin{pmatrix} X_{cam,i} \\ Y_{cam,i} \\ Z_{cam,i} \end{pmatrix} \quad (4)$$

In formula (4), $R_i$ represents the optical axis direction of the input viewpoint i (the input viewpoint i being the i-th input viewpoint out of a plurality of input viewpoints). $(x_{cam,i}, y_{cam,i}, z_{cam,i})$ represents the coordinates in the world coordinate system of the camera 101 at the input viewpoint i. $f_i$ represents the focal length of the input viewpoint i, $c_{xi}$ and $c_{yi}$ represent the principal position of the input viewpoint i. Moreover, t represents a constant. The following formula (5) can be obtained by solving formula (4) with respect to $(u_i, v_i)$.

$$\begin{pmatrix} u_i - c_{xi} \\ v_i - c_{yi} \\ f_i \end{pmatrix} = t^{-1} R_i \begin{pmatrix} X_0 - X_{cam,i} \\ Y_0 - Y_{cam,i} \\ Z_0 - Z_{cam,i} \end{pmatrix} \quad (5)$$

According to formula (5), first, the constant t can be calculated, and, moreover, $(u_i, v_i)$ can be calculated with use of the obtained constant t. In this way, the coordinates $(u_0, v_0)$ of a pixel of interest in the virtual viewpoint image can be converted into the coordinates $(u_i, v_i)$ of a pixel in the captured image. There is a high possibility that the coordinates $(u_0, v_0)$ of a pixel of interest in the virtual viewpoint image and the coordinates $(u_i, v_i)$ of a pixel in the captured image correspond to the same subject. Accordingly, pixel values (color information) of the coordinates $(u_i, v_i)$ of a pixel in the captured image can be used as pixel values (color information) of the coordinates $(u_0, v_0)$ of a pixel of interest in the virtual viewpoint image.

However, due to a difference in line-of-sight direction, the coordinates $(u_0, v_0)$ of a pixel of interest in the virtual viewpoint image and the coordinates $(u_i, v_i)$ of a pixel in the captured image do not necessarily correspond to the same subject. Moreover, due to an influence of, for example, the direction of a light source, even if these coordinates correspond to the same subject, there may be a difference in color between captured images. Therefore, in the first exemplary embodiment, the first rendering unit 309 and the second rendering unit 310 identify, from among a plurality of captured images, the coordinates ($u_i$, $v_i$) of a pixel in the captured image corresponding to the coordinates ($u_0$, $v_0$) of a pixel of interest in the virtual viewpoint image (i=1 to N, N being the number of cameras 101). Then, the first rendering unit 309 and the second rendering unit 310 combine pixel values of the identified pixel in a weighting manner. Here, a captured image in which a subject corresponding to the pixel of interest is not shown for the reason that, for example, the subject is located outside the image capturing range can be excluded from the targets for combination. The pixel values obtained by weighting combination in the above-described way are used as pixel values of the coordinates ($u_0$, $v_0$) of a pixel of interest in the virtual viewpoint image.

In this instance, at the same time, values in the coordinates ($u_0$, $v_0$) of a pixel of interest in the virtual viewpoint image of the motion blur amount map can also be generated by weighting combination of the motion blur amount map at a real viewpoint as with the pixel values.

In FIG. 5, an image 507 represents an example of a result of rendering performed by the first rendering unit 309 (a foreground virtual viewpoint image), and an image 508 represents an example of a result of rendering performed by the second rendering unit 310 (a non-motion blur virtual viewpoint image). In the image 507, the left arm portion which is quickly moving is rendered as an opaque and large lump. In the image 508, an image in which the left arm portion which is quickly moving has disappeared is rendered. Here, originally, the picture which is to be seen from the virtual viewpoint is a picture in which the left arm portion is seen through in a translucent way due to motion blur. In this way, blur which occurs in at least one of regions of a subject on an image due to motion of the subject is larger in the image 507 (the foreground virtual viewpoint image) than the image 508 (the non-motion blur virtual viewpoint image).

Referring back to the description of FIG. 4, in step S409, an alpha blending unit 311 alpha blends the foreground virtual viewpoint image and the non-motion blur virtual viewpoint image according to the motion blur amount, thus generating a motion blur blended virtual viewpoint image corresponding to the position and direction of the virtual viewpoint indicated by the virtual viewpoint parameter. In FIG. 5, an image 509 represents an example of the motion blur blended virtual viewpoint image. The alpha blending unit 311 alpha blends the image 507 (the foreground virtual viewpoint image) and the image 508 (the non-motion blur virtual viewpoint image) according to the motion blur amount map 505. In this way, the image 509 in which a portion of the subject included in the foreground virtual viewpoint image (the left arm portion which is moving quickly) is seen through in a translucent way can be generated. The alpha blending unit 311 is an example of a generation unit for generating a virtual viewpoint image according to a position and direction of the viewpoint indicated by an acquired viewpoint information, based on an acquired first shape information and an acquired second shape information, such that at least a part of an object corresponding to the second shape information is displayed in a translucent way within the virtual viewpoint image.

The alpha ($u$) is an example of a parameter for determining the combining ratio of values of pixels corresponding to each other between the foreground virtual viewpoint image and the non-motion blur virtual viewpoint image. For example, when the value of the motion blur amount map 505 is assumed to be x [pixel], a is expressed by the following formula (6). Then, red (R), green (G), and blue (B) values which are obtained as a result of rendering performed by the first rendering unit 309 (the foreground virtual viewpoint image) are assumed to be [$R_1$, $G_1$, $B_1$]. Moreover, R, G, and B values which are obtained as a result of rendering performed by the second rendering unit 310 (the non-motion blur virtual viewpoint image) are assumed to be [$R_2$, $G_2$, $B_2$]. Thus, the R, G, and B values of an output image can be determined by combining the R, G, and B values [R, $G_1$, $B_1$] and [$R_2$, $G_2$, $B_2$] with use of a according to the following formula (7).

$$\alpha = \frac{1}{(x+1)} \quad (6)$$

$$\begin{bmatrix} R \\ G \\ B \end{bmatrix} = \alpha \begin{bmatrix} R_1 \\ G_1 \\ B_1 \end{bmatrix} + (1-\alpha) \begin{bmatrix} R_2 \\ G_2 \\ B_2 \end{bmatrix} \quad (7)$$

As described above, in the first exemplary embodiment, the image processing apparatus 102 acquires motion information about a subject from a captured image, performs rendering while dividing a region of the subject of the captured image into a motion blur region and a non-motion blur foreground region, and alpha blends such regions. Accordingly, a virtual viewpoint image in which a foreground region having motion blur is seen in a natural translucent manner can be generated. Therefore, even in a case where motion blur has occurred in a captured image, a virtual viewpoint image can be appropriately generated.

In the first exemplary embodiment, an example in which rendering is performed while a region of the subject of the captured image is divided into two regions, i.e., a motion blur region and a non-motion blur foreground region has been described. However, the estimation of a shape and rendering can be performed while a region of the subject of the captured image is divided into three or more regions depending on the size of motion blur.

Moreover, for the purpose of reducing a computation resource, the second shape estimation unit 308 and the second rendering unit 310 can perform rendering of only the shape of the background without performing the estimation of the shape of the foreground and rendering thereof. In this case, [$R_2$, $G_2$, $B_2$] in formula (7) can be set as a result of rendering of the background image, and only the transparency can be changed according to the blur amount (the value of the motion blur amount map 505) of the foreground region ([$R_1$, $G_1$, $B_1$]).

Next, a second exemplary embodiment is described. In the above-described first exemplary embodiment, a foreground virtual viewpoint image and a non-motion blur virtual viewpoint image are generated based on the same set of images captured by a plurality of imaging apparatuses, and are then combined together. In the second exemplary embodiment, an example in which a short Tv virtual viewpoint image generated based on a first set of images acquired by cameras which perform short shutter-speed exposure and a long Tv virtual viewpoint image generated based on a second set of images acquired by cameras which perform long shutter-speed exposure are blended to produce an image is described. Here, the short shutter-speed exposure and the long shutter-speed exposure correspond to a moving image obtained with a relatively long exposure time and a moving image obtained with a relatively short exposure time, respectively. For example, in a moving image with 60 frames per second (fps), image capturing is assumed to be performed in such a manner that the long shutter-time corresponds to an exposure time of 1/100 sec and the short shutter-time corresponds to an exposure time of 1/1000 sec. The frequencies (fps) of these cameras are assumed to be the same, and the image capturing timing is assumed to be synchronized therebetween. Moreover, a plurality of cameras 101 is previously set as each of the camera 101 which performs short shutter-time exposure and the camera 101 which performs long shutter-time exposure. As described below, a virtual viewpoint image is generated based on captured images acquired by the cameras 101 which perform short shutter-time exposure, and a virtual viewpoint image is generated based on captured images acquired by the cameras 101 which perform long shutter-time exposure. In order for the respective virtual viewpoint images to be appropriately generated, it is favorable that the cameras 101 which perform short shutter-time exposure and the cameras 101 which perform long shutter-time exposure are arranged in a dispersed manner. For example, referring to FIG. 1, the cameras 101 which perform short shutter-time exposure and the cameras 101 which perform long shutter-time exposure can be alternately arranged every other camera. Furthermore, the number of cameras 101 which perform short shutter-time exposure and the number of cameras 101 which perform long shutter-time exposure can be the same or different from each other.

In the above-described first exemplary embodiment, a region in which motion blur is occurring is determined by estimating a moving object map in a time series of images obtained by one camera. This may cause the calculation of a moving object map to be relatively time-consuming. Therefore, in the second exemplary embodiment, while the calculation of a moving object map is not performed, both a group of images in which motion blur is relatively small due to short shutter-time exposure and a group of images in which motion blur is relatively large due to large shutter-time exposure are used to generate a virtual viewpoint image in a scene in which there is motion blur. In this way, the second exemplary embodiment differs from the first exemplary embodiment mainly in processing for determining a region in which motion blur is occurring. Accordingly, in the description of the second exemplary embodiment, portions similar to those in the first exemplary embodiment are assigned the respective same reference numerals used in FIG. 1 to FIG. 5, and the detailed description thereof is omitted.

Figure 6:
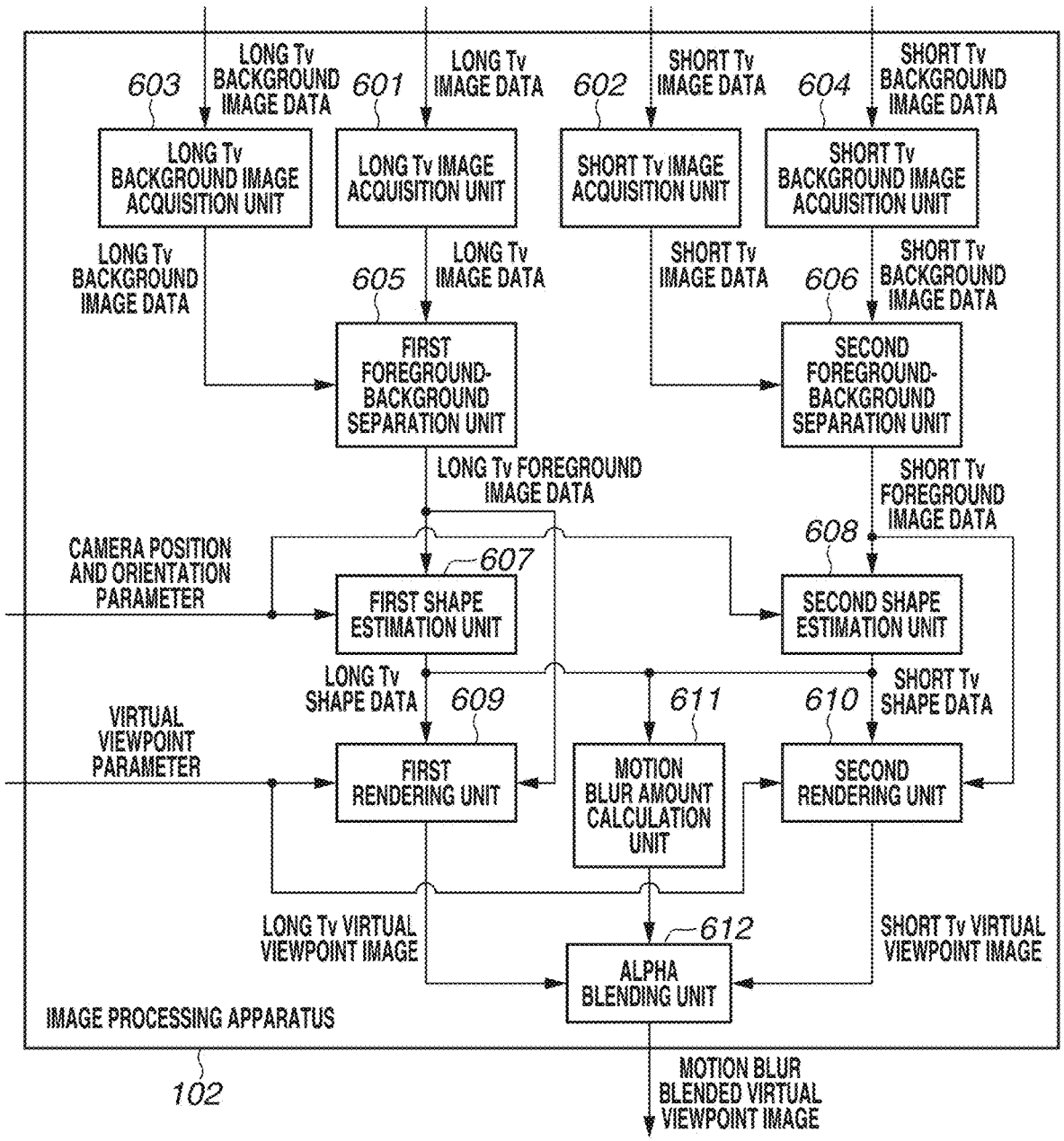
FIG. 6 is a diagram illustrating a second example of the functional configuration of the image processing apparatus.
Figure 7:
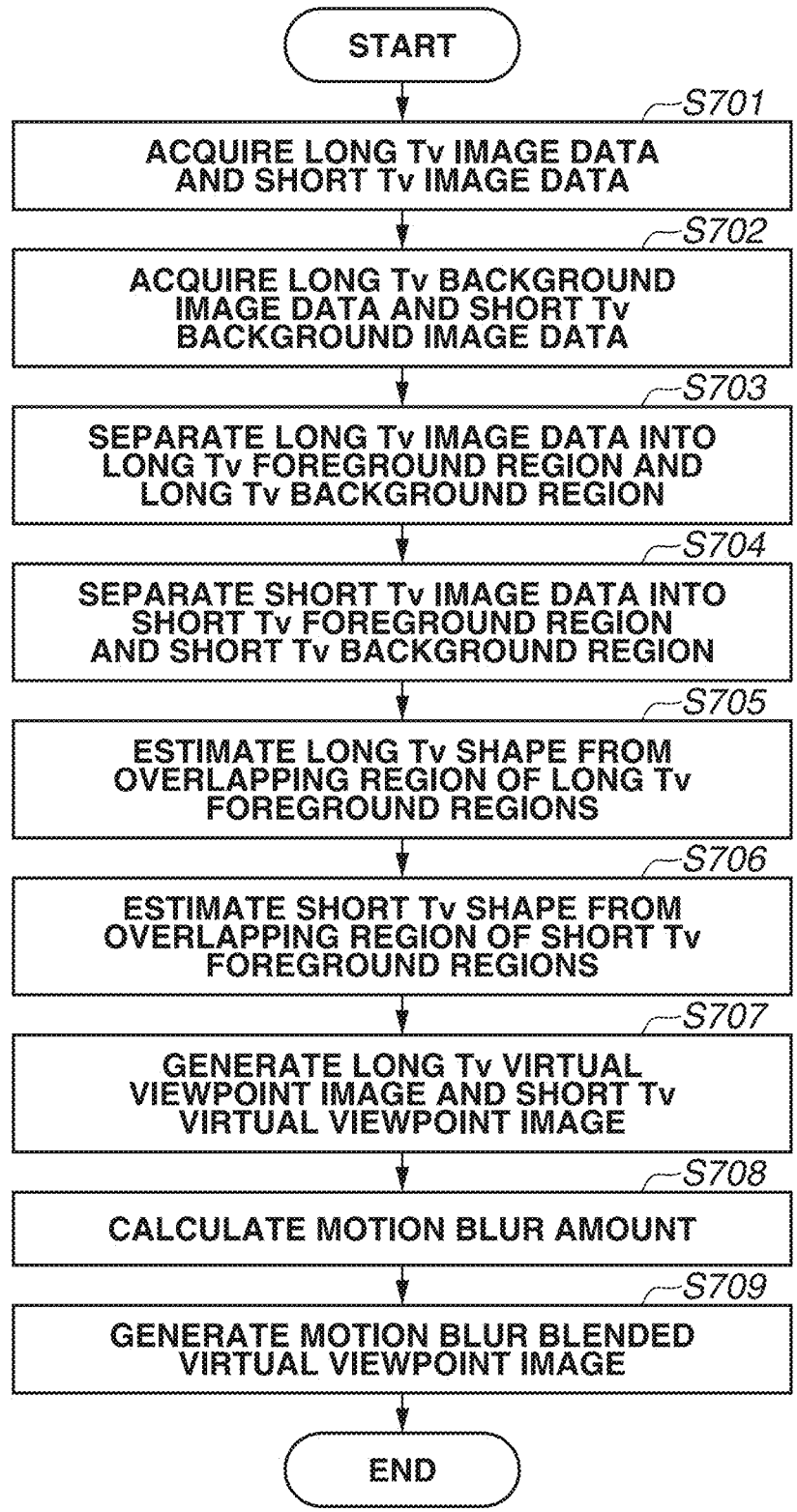
FIG. 7 is a flowchart illustrating a second example of the image processing method.
Figure 8:
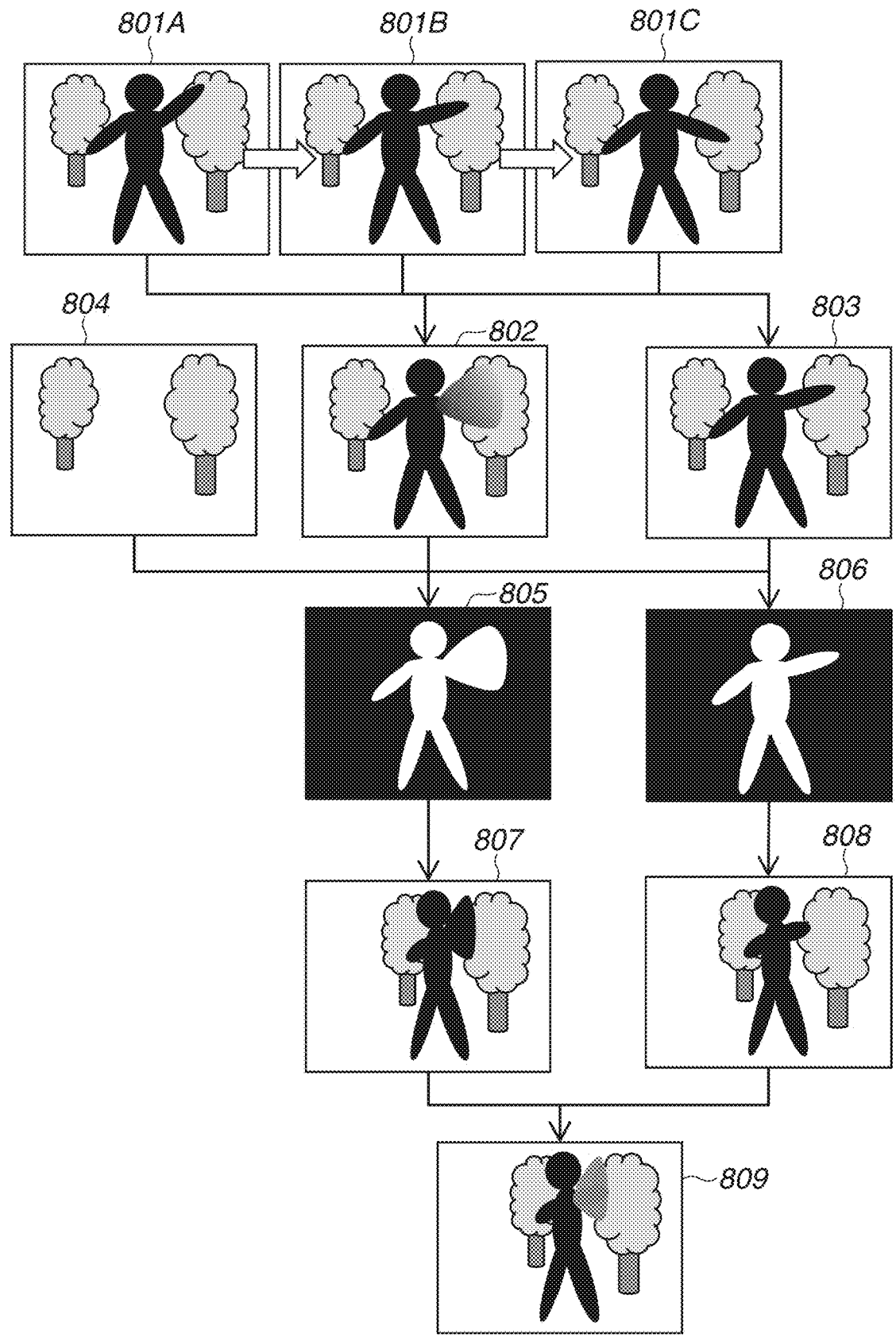
FIG. 8 is a diagram illustrating a second example of contents of image processing.

Hereinafter, an example of image processing performed by the image processing apparatus 102 in the second exemplary embodiment is described with reference to FIG. 6, FIG. 7, and FIG. 8. FIG. 6 is a block diagram illustrating an example of a functional configuration of the image processing apparatus 102 in the second exemplary embodiment. FIG. 7 is a flowchart illustrating an example of an image processing method according to the second exemplary embodiment. FIG. 8 is a schematic diagram illustrating an example of contents of image processing in the second exemplary embodiment.

In the second exemplary embodiment, the CPU 201 also executes a program stored in the ROM 203 to function as each block illustrated in FIG. 6, thus performing processing in the flowchart of FIG. 7. Furthermore, the CPU 201 does not necessarily need to perform all of the functions of the image processing apparatus 102, but the image processing apparatus 102 can include processing circuits corresponding to the respective functions thereof and the processing circuits can perform the respective functions.

FIG. 8 illustrates contents of image processing which is performed in a case where, as an example, image capturing is performed on a subject with the left arm being quickly moved. Images representing the actual motion of the subject are acquired in the order of an image 801A, an image 801B, and an image 801C. However, when the exposure time (Tv) of the cameras 101 is long, an image in which motion blur is occurring at the left arm portion, such as an image 802, is captured by the cameras 101. On the other hand, when the exposure time (Tv) of the cameras 101 is short, an image in which motion blur is not occurring at the left arm portion, such as an image 803, is captured by the cameras 101.

Hereinafter, an image captured by a camera 101 which has a relatively long exposure time (Tv) set therein is referred to as a "long Tv image" as needed, and an image captured by a camera 101 which has a relatively short exposure time (Tv) set therein is referred to as a "short Tv image" as needed.

In step S701, a long Tv image acquisition unit 601 acquires long Tv image data. A short Tv image acquisition unit 602 acquires short Tv image data. For example, in a case where a person has waved the left arm quickly as shown in the image 801A, the image 801B, and the image 801C in this order, the long Tv image becomes like an image 802, and the short Tv image becomes like an image 803.

Next, in step S702, a long Tv background image acquisition unit 603 acquires long Tv background image data. A short Tv background image acquisition unit 604 acquires short Tv background image data. The long Tv background image is an image captured with a relatively long exposure time (Tv) by each camera 101 in a state in which the subject 105 is not present, and is assumed to be previously stored in the external memory 208. The short Tv background image is an image captured with a relatively short exposure time (Tv) by each camera 101 in a state in which the subject 105 is not present, and is assumed to be previously stored in the external memory 208. It is favorable that the exposure time used for capturing a long Tv image and the exposure time used for capturing a long Tv background image are the same. Similarly, it is favorable that the exposure time used for capturing a short Tv image and the exposure time used for capturing a short Tv background image are the same. Moreover, it is favorable that the position and orientation of each camera 101 taken when the long Tv background image or the short Tv background image is captured are the same taken when the subject 105 is present. Referring to FIG. 8, for example, a background image such as an image 804 is acquired.

Next, in step S703, a first foreground-background separation unit 605 separates the long Tv image data into a long Tv foreground region and a long Tv background region. For example, the first foreground-background separation unit 605 determines whether, in mutually corresponding pixels of the image (long Tv image) 802 and the image (background image) 804, the absolute value of a difference therebetween in at least any one of color and texture exceeds a threshold value. With respect to each pixel, the first foreground-background separation unit 605 treats a region in which the absolute value exceeds the threshold value as a foreground region and allocates white (1) to pixels of the foreground region, and treats a region in which the absolute value does not exceed the threshold value as a background region and allocates black (0) to pixels of the background region. In this case, the region to which white (1) is allocated serves as a foreground region, and the region to which black (0) is allocated serves as a background region. The region determined to be a foreground region in this way is a long Tv foreground region, and the region determined to be a background region in this way is a long Tv background region. With this, an image such as an image 805 illustrated in FIG. 8 is obtained.

Next, in step S704, a second foreground-background separation unit 606 separates the short Tv image data into a short Tv foreground region and a short Tv background region. For example, the second foreground-background separation unit 606 determines whether, in mutually corresponding pixels of the image (short Tv image) 803 and the image (background image) 804, the absolute value of a difference therebetween in at least any one of color and texture exceeds a threshold value. With respect to each pixel, the second foreground-background separation unit 606 treats a region in which the absolute value exceeds the threshold value as a foreground region and allocates white (1) to pixels of the foreground region, and treats a region in which the absolute value does not exceed the threshold value as a background region and allocates black (0) to pixels of the background region. In this case, the region to which white (1) is allocated serves as a foreground region, and the region to which black (0) is allocated serves as a background region. The region determined to be a foreground region in this way is a short Tv foreground region, and the region determined to be a background region in this way is a short Tv background region. With this, an image such as an image 806 illustrated in FIG. 8 is obtained.

Next, in step S705, a first shape estimation unit 607 estimates, based on an overlapping region of multi-viewpoint long Tv foreground regions (long Tv foreground regions obtained by the respective cameras 101), the shape of a foreground region obtained in a case where image capturing has been performed with a relatively long exposure time. In the following description, this shape is referred to as a "long Tv shape" as needed.

Next, in step S706, a second shape estimation unit 608 estimates, based on an overlapping region of multi-viewpoint short Tv foreground regions (short Tv foreground regions obtained by the respective cameras 101), the shape of a foreground region obtained in a case where image capturing has been performed with a relatively short exposure time. In the following description, this shape is referred to as a "short Tv shape" as needed.

Next, in step S707, a first rendering unit 609 performs rendering of the long Tv shape, thus generating a virtual viewpoint image which is obtained assuming that image capturing has been performed with a relatively long exposure time from the virtual viewpoint. In the following description, this virtual viewpoint image is referred to as a "long Tv virtual viewpoint image" as needed. Moreover, a second rendering unit 610 performs rendering of the short Tv shape, thus generating a virtual viewpoint image which is obtained assuming that image capturing has been performed with a relatively short exposure time from the virtual viewpoint. In the following description, this virtual viewpoint image is referred to as a "short Tv virtual viewpoint image" as needed.

Here, with respect to a texture which is used when a virtual viewpoint image (a long Tv virtual viewpoint image or a short Tv virtual viewpoint image) is generated, an input image (a long Tv image or a short Tv image) which has been used when an image of the foreground region thereof is generated does not necessarily need to be used. For example, when the exposure time (Tv) becomes different, color may also change. Therefore, only a long Tv image can be used for a texture which is used when a virtual viewpoint image (a long Tv virtual viewpoint image or a short Tv virtual viewpoint image) is generated. In FIG. 8, an image 807 is the long Tv virtual viewpoint image, and, in the long Tv virtual viewpoint image, such as an image 807, a moving portion appears as a large and opaque lump. Moreover, an image 808 is the short Tv virtual viewpoint image, and, in the short Tv virtual viewpoint image, such as an image 808, the shape of the arm obtained when the arm has stopped at a certain moment appears. In this way, blur which occurs in at least one of regions of a subject on an image due to motion of the subject is larger in the image 807 (long Tv virtual viewpoint image) than in the image 808 (short Tv virtual viewpoint image).

Next, in step S708, a motion blur amount calculation unit 611 calculates a motion blur amount based on the magnitude of the absolute value of a difference between pixel values of mutually corresponding pixels of the long Tv virtual viewpoint image and the short Tv virtual viewpoint image. At this time, instead of the long Tv virtual viewpoint image and the short Tv virtual viewpoint image, the long Tv shape and the short Tv shape can be used.

Next, in step S709, an alpha blending unit 612 alpha blends the long Tv virtual viewpoint image and the short Tv virtual viewpoint image according to the motion blur amount, thus generating a motion blur blended virtual viewpoint image. For example, the alpha blending unit 612 sets R, G, and B values of the long Tv virtual viewpoint image as $[R_1, G_1, B_1]$ and sets R, G, and B values of the short Tv virtual viewpoint image as $[R_2, G_2, B_2]$ in formula (7), and is able to combine the long Tv virtual viewpoint image and the short Tv virtual viewpoint image according to formula (7). At this time, for example, as the motion blur amount is larger, the alpha blending unit 612 sets the value ($\alpha$) of alpha blending of the long Tv virtual viewpoint image smaller (in other words, lowers the blending rate of the long Tv virtual viewpoint image). Referring to FIG. 8, for example, performing alpha blending results in an image in which a portion blurring due to motion of the arm becomes translucent, such as an image 809, thus becoming an image as if actually captured at the virtual viewpoint and with a long exposure time (Tv).

As described above, according to the second exemplary embodiment, the image processing apparatus 102 performs rendering using both a group of images captured with short shutter-time exposure in which motion blur is small and a group of images captured with long shutter-time exposure in which motion blur is large, and alpha blends the respective rendered images. Accordingly, without having to calculate a motion map, it is possible to generate a virtual viewpoint image in a scene in which motion blur is occurring. Therefore, in addition to advantageous effects described in the first exemplary embodiment, an advantageous effect of being able to reduce a processing time can be attained.

Next, a third exemplary embodiment is described. In the third exemplary embodiment, an example of switching the ratio of alpha blending or simplifying processing according to a difference between a virtual viewpoint and a real viewpoint (actual viewpoint) of the camera is described. In the above-described first exemplary embodiment and second exemplary embodiment, an issue occurring in a case where a virtual viewpoint image of a portion which becomes translucent due to motion blur has been generated is a case where the virtual viewpoint and the real viewpoint of the camera are distant from each other. In a case where the virtual viewpoint and the real viewpoint of the camera are sufficiently close to each other, since a video image captured by the camera is close to a video image seen from the virtual viewpoint, a natural picture can be obtained even by pasting a real video image captured by the camera to the shape of a portion in which motion blur is occurring. Therefore, in the third exemplary embodiment, an example of performing switching of whether to perform alpha blending and control of the value (=α) of alpha blending in performing alpha blending, according to a distance between the virtual viewpoint and the real viewpoint of the camera is described. In this way, the third exemplary embodiment differs from the first and second exemplary embodiments mainly in processing concerning alpha blending. Accordingly, in the description of the third exemplary embodiment, portions similar to those in the first and second exemplary embodiments are assigned the respective same reference numerals used in FIG. 1 to FIG. 8, and the detailed description thereof is omitted.

Figure 9:
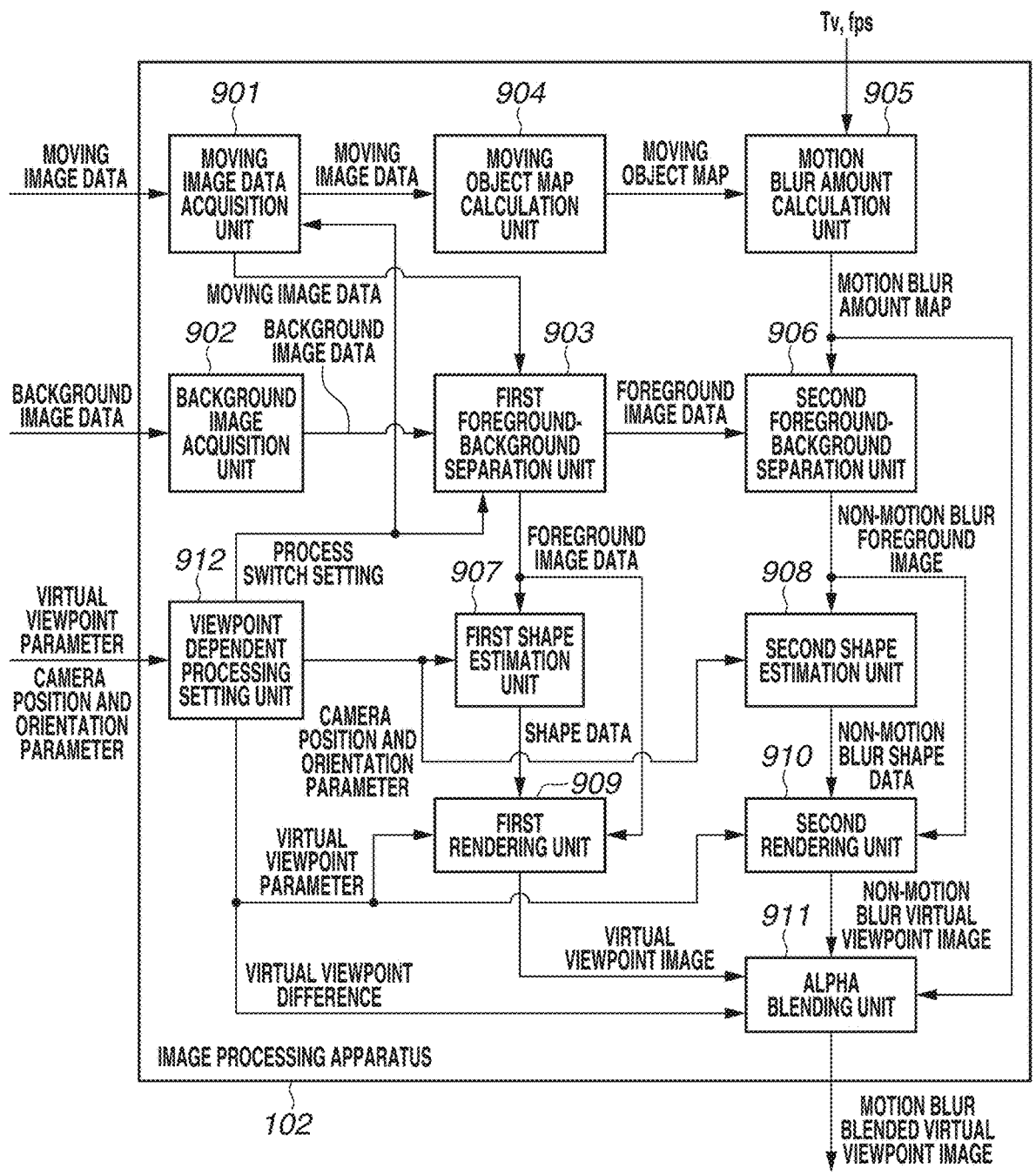
FIG. 9 is a diagram illustrating a third example of the functional configuration of the image processing apparatus.

Hereinafter, an example of image processing performed by the image processing apparatus 102 in the third exemplary embodiment is described with reference to FIG. 9 and FIG. 10. FIG. 9 is a block diagram illustrating an example of a functional configuration of the image processing apparatus 102 in the third exemplary embodiment. FIG. 10 is a flowchart illustrating an example of an image processing method according to the third exemplary embodiment.

The image processing apparatus 102 illustrated in FIG. 9 further includes a viewpoint dependent processing setting unit 912 in addition to the image processing apparatus 102 illustrated in FIG. 3. Units 901 to 911 illustrated in FIG. 9 are the same as the units 301 to 311 illustrated in FIG. 3. However, the moving object map calculation unit 904 and the first foreground-background separation unit 903 in the third exemplary embodiment change their processing operations according to process switch setting which is output as a result of the viewpoint dependent processing setting unit 912. Moreover, in a case where the virtual viewpoint and the real viewpoint of the camera 101 are sufficiently close to each other, the moving image data acquisition unit 901 does not send moving image data to the moving object map calculation unit 904. In this case, the image processing apparatus 102 does not perform processing which is performed by the moving object map calculation unit 904 and subsequent processing blocks. Moreover, similarly, the first foreground-background separation unit 903 does not send foreground image data to the second foreground-background separation unit 906. In this case, the image processing apparatus 102 does not perform processing which is performed by the second foreground-background separation unit 906 and subsequent processing blocks.

Moreover, in the third exemplary embodiment, the CPU 201 also executes a program stored in the ROM 203 to function as each block illustrated in FIG. 9, thus performing processing in the flowchart of FIG. 10. Furthermore, the CPU 201 does not necessarily need to perform all of the functions of the image processing apparatus 102, but the image processing apparatus 102 can include processing circuits corresponding to the respective functions thereof and the processing circuits can perform the respective functions.

Steps S1001 to S1003 illustrated in FIG. 10 are the same as the steps S401 to S403 illustrated in FIG. 4, and, therefore, the detailed description thereof is omitted.

In step S1004, the viewpoint dependent processing setting unit 912 determines whether the virtual viewpoint and the real viewpoint of the camera 101 are sufficiently close to each other. As the real viewpoint of the camera 101 for use in this determination, the real viewpoint of a camera 101 serving as a representative of a plurality of cameras 101 in generating a virtual viewpoint image is employed. For example, the real viewpoint of a camera 101 which captures an image serving as a texture in generating a virtual viewpoint image can be employed. Moreover, the real viewpoint of a camera 101 which is closest to the virtual viewpoint can also be employed. If it is determined that the virtual viewpoint and the real viewpoint of the camera 101 are sufficiently close to each other (YES in step S1004), the processing proceeds to step S1011, and, if not so (NO in step S1004), the processing proceeds to step S1005. The viewpoint dependent processing setting unit 912 is an example of a determination unit for determining whether to generate a non-motion blur virtual viewpoint image based on a position of an imaging apparatus included in a plurality of imaging apparatuses and a position of the viewpoint indicated by a viewpoint information. The indices for evaluating the closeness between viewpoints include, for example, at least one of the position of each viewpoint and the orientation of each viewpoint (an angle between a virtual line connecting the viewpoint and the subject and a reference line (for example, a horizontal plane)). Here, for example, as the direction from the input viewpoint to the subject is closer to the direction from the output viewpoint to the subject, a subject image shown in the captured image is considered to be closer to a subject image seen from the virtual viewpoint. Accordingly, the closeness between viewpoints can be evaluated based on the closeness between a directional vector indicating the direction from the input viewpoint to the subject and a directional vector indicating the direction from the output viewpoint to the subject. Specifically, the closeness between viewpoints can be evaluated by determining whether an angle between a directional vector (with any size) indicating the direction from the virtual viewpoint to the subject and a directional vector (with any size) indicating the direction from the output viewpoint to the subject is smaller than a threshold value.

In addition to such directions, the closeness between viewpoints can also be evaluated in further consideration of the position of a subject situated in a direction of interest within a field of view of the camera 101. For example, if the position of the subject is close to the outside of a field of view of the camera 101, the closeness between viewpoints can be evaluated in such a manner that the viewpoint difference becomes large. In this case, for example, even when the direction from the input viewpoint (the real viewpoint of the camera 101) is close to the direction from the output viewpoint (the virtual viewpoint) to the subject, if the subject is not included in the field of view of the camera 101, it can be evaluated that the closeness between the virtual point and the real viewpoint of the camera 101 is not high. In this way, the indices for evaluating the closeness between viewpoints include, for example, the field of view of each viewpoint. In the following description, the closeness between the virtual viewpoint and the real viewpoint of the camera 101 is referred to as a "virtual viewpoint difference" as needed.

As mentioned above, if, in step S1004, it is determined that the virtual viewpoint difference is large (NO in step S1004), the processing proceeds to step S1005. Processing in steps S1005 to S1009 is the same as the processing in steps S404 to S408 illustrated in FIG. 4, and, therefore, the detailed description thereof is omitted.

Then, the processing proceeds to step S1010. In step S1010, the alpha blending unit 911 alpha blends the foreground virtual viewpoint image and the non-motion blur virtual viewpoint image according to the motion blur amount and the virtual viewpoint difference, thus generating and outputting a motion blur blended virtual viewpoint image. The alpha blending unit 911 is an example of an output unit for outputting the motion blur blended virtual viewpoint image generated by combining the foreground virtual viewpoint image and the non-motion blur virtual viewpoint image in a case where it is determined to generate the non-motion blur virtual viewpoint image. At this time, as the motion blur amount is larger, the alpha blending unit 911 sets the blending rate of the foreground virtual viewpoint image (the value (=α) of alpha blending in performing alpha blending) smaller. Moreover, as the virtual viewpoint difference is smaller, the alpha blending unit 911 sets the blending rate of the foreground virtual viewpoint image (the value (=α) of alpha blending in performing alpha blending) larger. Thus, processing performed in a case where the virtual viewpoint difference is large comes to an end.

On the other hand, if, in step S1004, it is determined that the virtual viewpoint difference is small (YES in step S1004), the processing proceeds to step S1011. In step S1011, the first shape estimation unit 907 estimates the shape of the foreground region. The content of this processing is the same as that in step S407, and, therefore, the detailed description thereof is omitted.

Next, in step S1012, the first rendering unit 909 performs rendering of the shape of the foreground region, thus generating and outputting a virtual viewpoint image. The first rendering unit 909 is an example of an output unit for outputting the foreground virtual viewpoint image in a case where it is determined not to generate the non-motion blur virtual viewpoint image. The content of this processing is the same as that in step S408, and, therefore, the detailed description thereof is omitted. Here, the virtual viewpoint image to be output is not an image obtained by performing alpha blending but an image produced from only an image obtained by performing rendering of the shape including motion blur. Without having to perform alpha blending, in a case where the virtual viewpoint and the real viewpoint of the camera 101 are sufficiently close to each other, an image with natural motion blur can be rendered.

As described above, according to the third exemplary embodiment, the image processing apparatus 102 switches the execution or non-execution of generation of the motion blur map and the non-motion blur virtual viewpoint image depending on whether the virtual viewpoint and the real viewpoint of the camera 101 are sufficiently close to each other. Moreover, the image processing apparatus 102 controls the blending rate in alpha blending in the case of generating a non-motion blur virtual viewpoint image according to the closeness between the virtual viewpoint and the real viewpoint of the camera 101. Accordingly, not only an image with natural motion blur can be rendered but also a processing time therefor can be reduced.

The technique and method described in the third exemplary embodiment can also be applied to the second exemplary embodiment. In such a case, for example, in a case where the virtual viewpoint and the real viewpoint of the camera 101 are sufficiently close to each other, processing for generating a short Tv virtual viewpoint image is omitted.

Furthermore, all of the above-described exemplary embodiments are merely specific examples in implementing the present invention, and should not be construed to limit the technical scope of the present invention. In other words, the present invention can be implemented in various forms or manners without departing from the technical idea thereof or the principal feature thereof.

According to the above-described exemplary embodiments, even in a case where motion blur of a subject has occurred in a captured image, a virtual viewpoint image can be appropriately generated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™),a flash memory device, a memory card, and the like.

While the present disclosure has been described with reference to exemplary embodiments, the scope of the following claims are to be accorded the broadest interpretation so as to encompass all such modifications and equivalent structures and functions.

What is claimed is:

1. An image processing system comprising:
one or more memories storing instructions; and
one or more processors executing the instructions to:
obtain shape information for specifying a three-dimensional shape of an object located within an image capturing region, based on a region of an object extracted from a captured image by a first extraction method and a region of an object extracted from the captured image by a second extraction method different from the first extraction method, the captured image being obtained by an imaging apparatus among a plurality of imaging apparatuses which perform image capturing of the image capturing region from a plurality of directions, the first extraction method being a method for extracting the object based on the captured image and an background image corresponding to the captured image, and the second extraction method being a method for extracting the object based on the captured image and another captured image obtained by the imaging apparatus obtaining the captured image at different timing,
obtain viewpoint information for specifying a virtual viewpoint, and generate a virtual viewpoint image based on the obtained viewpoint information and the obtained shape information.

2. The image processing system according to claim 1, wherein
the imaging apparatus is configured to obtain a moving image including a plurality of frames, the captured image and the another captured image being included in the moving image as a frame.

3. The image processing system according to claim 1, wherein the obtained shape information includes a first shape information for specifying a three-dimensional shape of the object based on the region of the object extracted from the captured image by the first extraction method and a second shape information for specifying a three-dimensional shape of the object based on the region of the object extracted from the captured image by the second extraction method.

4. The image processing system according to claim 3, wherein the first shape information and the second shape information represent a three-dimensional shape about an identical object.

5. The image processing system according to claim 3, wherein
a first virtual viewpoint image is generated based on the obtained viewpoint information and the obtained first shape information;
a second virtual viewpoint image is generated based on the obtained viewpoint information and the obtained second shape information; and
the virtual viewpoint image is generated by combining the first virtual viewpoint image and the second virtual viewpoint image.

6. The image processing system according to claim 5, wherein the virtual viewpoint image is generated by combining the first virtual viewpoint image and the second virtual viewpoint image at a combining ratio determined based on a motion amount of the object located within the image capturing region.

7. The image processing system according to claim 5, wherein the virtual viewpoint image is generated by combining the first virtual viewpoint image and the second virtual viewpoint image at a combining ratio determined based on a position of an imaging apparatus included in the plurality of imaging apparatuses and a position of the virtual viewpoint specified based on the obtained viewpoint information.

8. The image processing system according to claim 5, wherein the virtual viewpoint image is generated by alpha blending the first virtual viewpoint image and the second virtual viewpoint image.

9. The image processing system according to claim 5, wherein the one or more processors further execute the instructions to:
determine whether to generate the second virtual viewpoint image based on a position of an imaging apparatus included in the plurality of imaging apparatuses and the position of the virtual viewpoint specified based on the obtained viewpoint information;
output, the virtual viewpoint image, the first virtual viewpoint image in a case where it is determined not to generate the second virtual viewpoint image, and
output the virtual viewpoint image generated by combining the first virtual viewpoint image and the second virtual viewpoint image in a case where it is determined to generate the second virtual viewpoint image.

10. The image processing system according to claim 1, wherein the object is a person or a part of the person.

11. An image processing method comprising:
obtain shape information for specifying a three-dimensional shape of an object located within an image capturing region, based on a region of an object extracted from a captured image by a first extraction method and a region of an object extracted from the captured image by a second extraction method different from the first extraction method, the captured image being obtained by an imaging apparatus among a plurality of imaging apparatuses which perform image capturing of the image capturing region from a plurality of directions, the first extraction method being a method for extracting the object based on the captured image and an background image corresponding to the captured image, and the second extraction method being a method for extracting the object based on the captured image and another captured image obtained by the imaging apparatus obtaining the captured image at different timing,
obtain viewpoint information for specifying a virtual viewpoint, and
generate a virtual viewpoint image based on the obtained viewpoint information and the obtained shape information.

12. The image processing method according to claim 11, wherein
the imaging apparatus is configured to obtain a moving image including a plurality of frames, the captured image and the another captured image being included in the moving image as a frame.

13. A non-transitory computer-readable storage medium storing computer-executable instructions that, when executed by a computer, cause the computer to perform an image processing method, the image processing method comprising:
obtain shape information for specifying a three-dimensional shape of an object located within an image capturing region, based on a region of an object extracted from a captured image by a first extraction method and a region of an object extracted from the captured image by a second extraction method different from the first extraction method, the captured image being obtained by an imaging apparatus among a plurality of imaging apparatuses which perform image capturing of the image capturing region from a plurality of directions, the first extraction method being a method for extracting the object based on the captured image and an background image corresponding to the captured image, and the second extraction method being a method for extracting the object based on the captured image and another captured image obtained by the imaging apparatus obtaining the captured image at different timing,
obtain viewpoint information for specifying a virtual viewpoint, and
generate a virtual viewpoint image based on the obtained viewpoint information and the obtained shape information.

* * * * *